Dec. 17, 1935.                 U. LAMM                2,024,172
              GASEOUS DISCHARGE CONVERTER WITH CONTROL GRIDS
                         Filed July 7, 1933
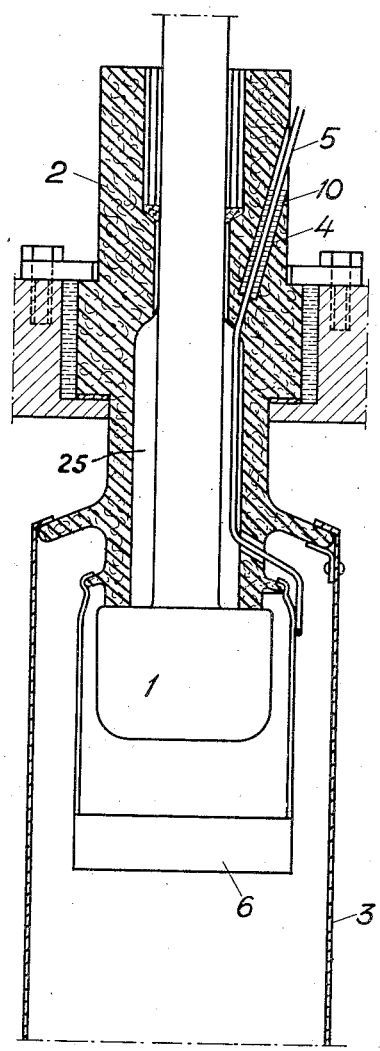
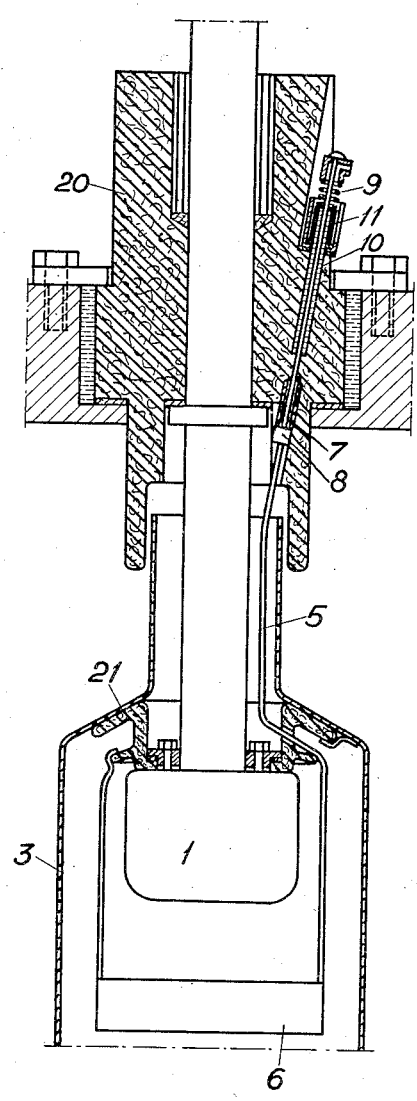
Inventor
Uno Lamm
By Wm Wallace White
            Attorney.

Patented Dec. 17, 1935

2,024,172

UNITED STATES PATENT OFFICE 2,024,172

GASEOUS DISCHARGE CONVERTER WITH CONTROL GRIDS

Uno Lamm, Ludvika, Sweden, assignor to Allmänna Svenska Elektriska Aktiebolaget, Vasteras, Sweden, a corporation of Sweden Application July 7, 1933, Serial No. 679,345
In Sweden July 11, 1932

4 Claims. (Cl. 250—27.5)

In ion valves having main receptacles of metal and control grids arranged in front of the anodes and adapted to receive a voltage from the outside, it has hitherto been usual to arrange special leading-in insulators for the leads to the control grids. According to the present invention, these leads are carried through holes in the insulator bushing of the anode, whereby several advantages are gained. First, the part of the grid lead which is inside the receptacle can be arranged entirely inside the anode sleeve and thus be protected by the latter. Further, the whole arrangement will be simplified by the omission of extra bushings, and especially it will be easy to apply it to gaseous discharge converters which have earlier operated without grid control for the anodes.

Three forms of the invention, applied to different types of anode insulators, are illustrated in longitudinal sections in Figs. 1-2 of the accompanying drawing.

In Fig. 1, the anode 1 has an insulator 2 in one piece, forming in the usual manner leading in bushing as well as screening insulator and support for the anode sleeve 3. Said insulator is pierced by an oblique hole 4 containing the conductor 5 leading to the anode grid 6. The fact that the spaces 25 through which the wire 5 passes, without any solid insulation between it and the anode stem, is evacuated and screened off from the ionized spaces within the container by the insulator 2 provides a sufficient insulation by the two conductors even at a rather high difference of potential such as may occur during the blocking intervals. The conductor generally carries a very small current and can therefore consist for instance of a thin platinum wire fused into the insulator or its glazing. It can also be sealed by means of a reliable cement or by a packing.

An example of a sealing by packing is shown in Fig. 2 which moreover shows an application to an anode with the insulation divided into a leading-in bushing 20 and another insulator 21 serving as a support for the anode sleeve 3. In this form, the insulator 20 and the sleeve 3 together screen the evacuated space 35 from the ionized space. It is not necessary to provide a gas-tight fit for the grid conductor 5 in the insulator 21. In the insulator 20, the lead 5 is sealed by means of an asbestos packing 7 which is tightened by means of a flange 8 on the lead under the influence of a compression spring 9. Outside the sealing surfaces there may here as in the other forms be a quantity of mercury 10 in the usual manner. The level of said mercury can be read from outside by means of a glass tube 11.

I claim as my invention:—

1. In gaseous discharge converters, an evacuated vessel, an anode inside said vessel and having a stem penetrating the wall thereof, an insulator bushing fitting gas-tight around said anode stem and in a surrounding wall, a control grid for said anode, a conductor for impressing a voltage on said grid running alongside said anode stem through the wall of the vessel, means to shield a space around said anode stem from the ionized space within the vessel, said insulator bushing having a hole therein accommodating said conductor in a gas-tight manner.

2. In gaseous discharge converters, an evacuated vessel, an anode inside said vessel and having a stem penetrating the wall thereof, an insulator bushing fitting gas-tight around said anode stem and in a surrounding wall, a control grid for said anode, a conductor for impressing a voltage on said grid running alongside said anode stem through the wall of the vessel, means to shield a space around said anode stem from the ionized space within the vessel, said insulator bushing having a hole therein for the passage of said conductor, with gas-tightness insured by fusion.

3. In gaseous discharge converters, an evacuated vessel, an anode inside said vessel and having a stem penetrating the wall thereof, an insulator bushing fitting gas-tight around said anode stem and in a surrounding wall, a control grid for said anode, a conductor for impressing a voltage on said grid running alongside said anode stem through the wall of the vessel, means to shield a space around said anode stem from the ionized space within the vessel, said insulator bushing having a hole therein accommodating said conductor in a gas-tight manner, and a quantity of mercury sealing said conductor in said hole.

4. In gaseous discharge converters, an evacuated vessel, an anode inside said vessel and having a stem penetrating the wall thereof, an insulator bushing fitting gas-tight around said stem and in a surrounding wall, a control grid for said anode, means to shield a space around said anode stem from the ionized space within the vessel, a conductor for impressing a voltage on said grid passing through said bushing and said space and connected to said grid, said conductor fitting tightly in said bushing.

UNO LAMM.